United States Patent [19]
Carré

[11] Patent Number: 4,533,025
[45] Date of Patent: Aug. 6, 1985

[54] DISC BRAKE WITH A SLIDING CALIPER

[75] Inventor: Jean-Jacques Carré, Le Raincy, France

[73] Assignee: Societe Anonyme D.B.A., Paris, France

[21] Appl. No.: 692,328

[22] Filed: Jan. 17, 1985

Related U.S. Application Data

[63] Continuation of Ser. No. 445,131, Nov. 29, 1982, abandoned.

[30] Foreign Application Priority Data

Nov. 30, 1981 [FR] France ................................. 81 22345

[51] Int. Cl.³ ............................................. F16D 65/14
[52] U.S. Cl. .................. 188/73.44; 188/72.4; 188/73.39; 188/73.1
[58] Field of Search ................... 188/71.1, 72.4, 73.31, 188/73.36, 73.37, 73.39, 73.43, 73.44, 73.45, 73.1

[56]  References Cited
U.S. PATENT DOCUMENTS

| | | | |
|---|---|---|---|
| 3,166,157 | 1/1965 | Burnett | 188/71.1 |
| 3,166,158 | 0/1965 | Burnett | 188/73 |
| 3,184,005 | 5/1965 | Thirion | 188/73.43 |
| 3,395,780 | 8/1968 | Swiff | 188/73.43 X |
| 3,422,935 | 1/1969 | House | 188/73.43 |
| 3,942,611 | 0/1976 | Burnett | 188/73 |
| 4,131,699 | 10/1978 | Tsuruta et al. | 188/73.43 |
| 4,189,032 | 2/1980 | Farr | 188/73.44 |

FOREIGN PATENT DOCUMENTS

| | | |
|---|---|---|
| 1145864 | 5/1957 | France . |
| 1392267 | 2/1965 | France . |
| 1534085 | 6/1968 | France . |
| 2272298 | 10/1973 | France . |
| 2176357 | 10/1973 | France . |
| 2252035 | 11/1973 | France . |
| 2222571 | 10/1974 | France . |
| 2416394 | 8/1979 | France . |
| 679845 | 1/1965 | Italy ................................. 188/73.45 |

Primary Examiner—George E. A. Halvosa
Attorney, Agent, or Firm—Larry J. Palguta; Ken C. Decker

[57] ABSTRACT

A disc brake of the type comprising a caliper (10) mounted to slide on a fixed support (12) by way of a pin (14) extending parallel to the axis (0) of the disc (16), the fixed support (12) comprising two arms (28, 30) extending radially towards the periphery of the disc (16), the latter defining when it rotates in the forward direction of rotation (AV), a front arm (28) and a rear arm (30) of the fixed support (12), a brake motor (32) acting directly on an inner friction element (40) and, as a result of reaction via the caliper (10), on an outer friction (42). According to the invention, the pin (14) is associated with the rear arm (30) of the fixed support, the inner friction element (40) bearing on a bearing surface (48) formed on the front arm (28) of the fixed support (12) when the brake motor (32) is actuated to slow down rotation in the forward direction of rotation of the disc, the outer friction element (42) being fixed to the sliding caliper (10) to which it transmits the frictional forces generated when it is stressed to engage frictionally with the rotating disc (16).

5 Claims, 4 Drawing Figures

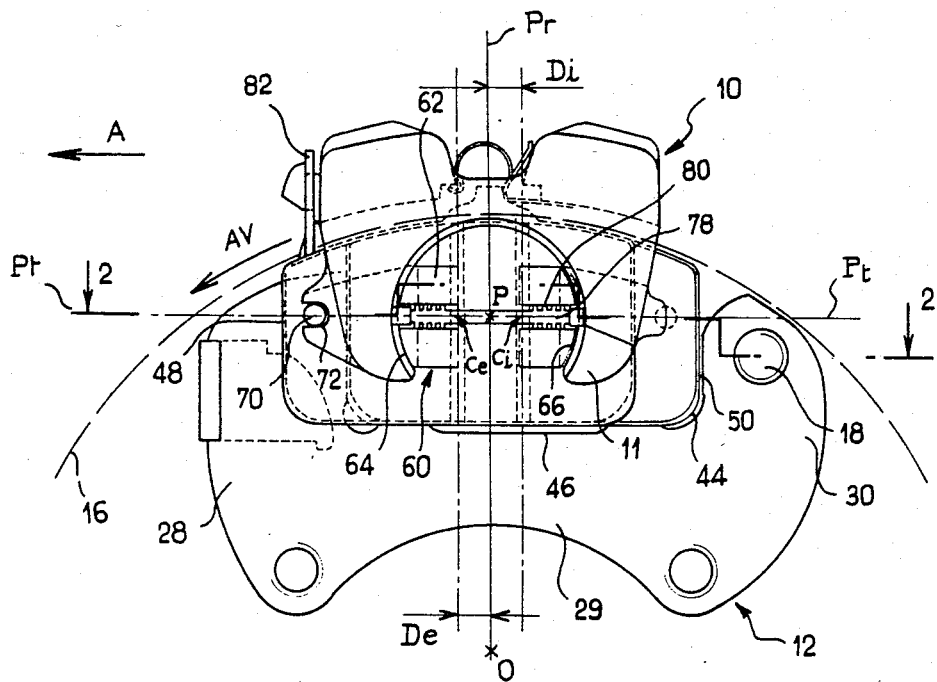
FIG_1
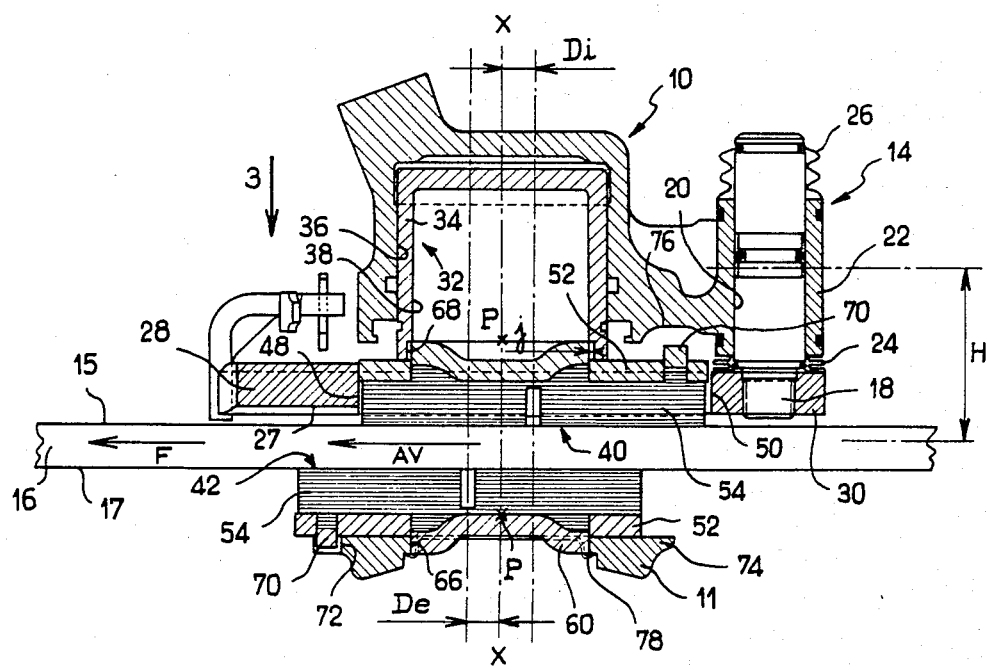
FIG_2

DISC BRAKE WITH A SLIDING CALIPER

This is a continuation of co-pending application Ser. No. 445,131 filed Nov. 29, 1982, now abandoned.

The subject of the present invention is a disc brake, the caliper of which is mounted to slide on a fixed support by means of a single axial pin.

The European patent application published under No. 0,030,502 illustrates and describes a disc brake the caliper of which is mounted to slide on a fixed support, in an aperture in which is received so as to be anchored and to slide axially the two friction elements capable of engaging frictionally with the opposite faces of the rotating disc when a brake motor is activated, the caliper being mounted to slide by means of an axial pin fixed to the fixed support and received so as to slide in a bore formed opposite it in the caliper. In this brake, the fixed support comprises two arms extending radially towards the periphery of the disc in a plane substantially parallel to the plane of the disc, the two arms being prolonged by two transverse arms extending axially beyond the periphery of the disc. In this brake, when it is intended to slow down the rotation of the rotating disc in the forward direction of rotation corresponding to forward movement of the vehicle, the brake motor is actuated so as to cause the two friction elements to engage frictionally with the opposite faces of the disc. The forces generated as a result of the frictional engagement of the inner friction element are transmitted to the front arm of the fixed support; in the same way, the frictional forces generated by the frictional engagement of the outer friction element with the corresponding face of the rotating disc are transmitted to the same front arm of the fixed support. Only a small fraction, resulting from the elastic deformation of the front arm of the fixed element, of the frictional forces generated by the outer friction element is transmitted to the rear arm of the fixed support by means of the sliding caliper and the axial pin.

The French patent application published under No. 2,422,863 illustrates and describes a disc brake, the caliper of which is mounted to slide on a fixed support by means of a single axial pin fixed to the fixed support and received so as to slide in a corresponding bore of the caliper. In this brake, the fixed support comprises a single arm extending radially towards the periphery of the disc in a plane parallel to the latter. The two friction members are received so as to be anchored and to slide on the sliding caliper. When the brake motor is actuated to cause slowing down of the rotation of the rotating disc, the frictional forces generated both by the inner friction member and by the outer friction member are transmitted to the single arm of the fixed support by means of the caliper and the single axial pin.

In the two types of disc brake with a single axial pin, which have just been described, all the braking forces are understood to be transmitted to a main or single arm of the fixed support which absorbs the greatest part or the whole of these frictional forces. In the first type of disc brake mentioned above, it is therefore necessary to provide a front arm of the fixed support of substantial cross-section which can absorb the frictional forces and resist fatigue, this front arm moreover being bulky and heavy because of its structure extending beyond the periphery of the disc. In the second type of disc brake mentioned above, transmission of the whole of the frictional forces to the single arm of the fixed support also requires an arm of substantial cross-section, but also an axial pin of substantial diameter to allow the transmission of the frictional forces.

The object of the invention is to propose a disc brake with a single axial pin which has all the advantages of this type of brake, that is to say especially elimination of the alignment of the two pins in the disc brakes of this latter type, and in which the frictional forces generated by the inner and outer friction elements are distributed equally over two arms of the fixed support.

Moreover, the object of the invention is to correct the differential wear of each friction element which causes one end of the friction element to be more worn than the other end. This kind of wear is specially critical on sliding brakes and more especially on sliding brakes with a single axial pin.

With this in mind, the invention proposes a disc brake of the type comprising a caliper mounted to slide on a fixed support by means of a pin extending parallel to the axis of the disc, said fixed support comprising two arms extending radially towards the periphery of the disc, the latter defining, when it rotates in the forward direction of rotation, a front arm and a rear arm of the fixed support, a brake motor acting directly on an inner friction element and, as a result of reaction via the caliper, on an outer friction element, characterized in that said pin is associated with said rear arm of the fixed support, said inner friction element bearing on a bearing surface formed on said front arm of the fixed support when the brake motor is actuated to slow down rotation in the forward direction of rotation of the disc, said outer friction element being fixed to said sliding caliper to which it transmits the frictional forces generated when it is stressed to engage frictionally with said rotating disc and in that said brake comprises differential wear correction means for each friction element.

It will be understood that, as a result of such a structure, the frictional forces generated by the inner friction element are transmitted in full to said front arm of the fixed support, the frictional forces generated by the outer pad being transmitted to the rear arm of the fixed support via the sliding caliper and the axial pin.

According to another characteristic of the invention, the disc brake proposed is of the type in which the brake motor comprises a piston mounted to slide in a bore of the caliper, the inner and outer friction elements each comprising a support plate to which a friction lining is fixed, this brake being characterized in that the center of the friction lining of the inner friction element is offset tangentially in the direction of the rear arm of the fixed support relative to a radial plane passing through the axis of the piston of the brake motor, and in that the center of the friction lining of the outer friction element is offset tangentially in the direction of the front arm of the fixed support relative to said radial plane.

According to another characteristic of the invention, the disc brake is characterized in that said wear correction means are formed by said pin of which the diameter and center point of the sliding are determined to achieve deflection of said pin when said friction elements are stressed to engage frictionally with the rotating disc, said deflection substantially compensating the caliper rotation in the tangential plane when said caliper is submitted to friction forces.

These characteristics make it possible to create, during braking, an opposing torque to the torque introduced as a result of the distance between the sliding motion provided by the single axial pin and the drag force of the friction linings avoiding by that way a differential wear on each friction element.

Other characteristics and advantages of the disc brake which is the subject of the present invention will emerge from a reading of the detailed description of the brake, with reference to the attached drawings in which:

FIG. 1 is a front view of a disc brake produced according to the teachings of the present invention;

FIG. 2 is a view in a section along the line 2—2 of FIG. 1;

Figure 3:
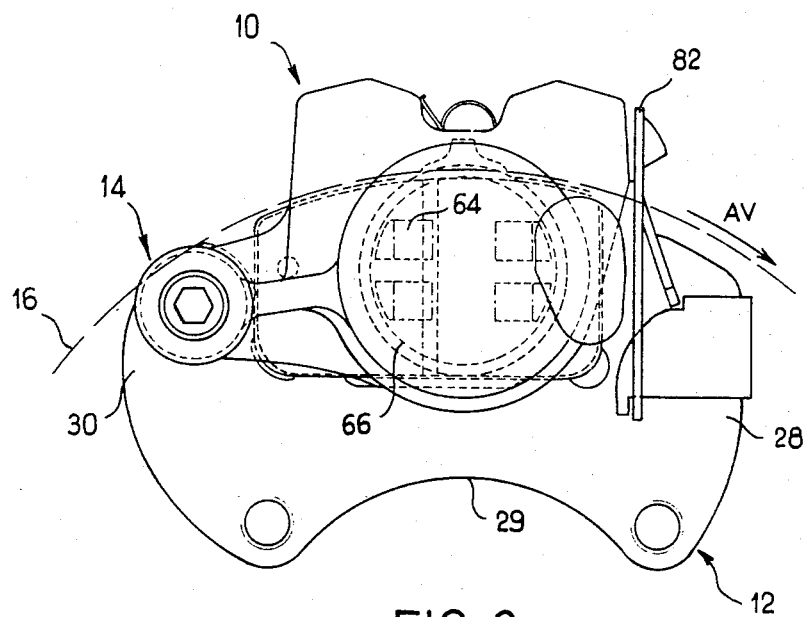
FIG. 3 is a rear view of the disc brake in the direction of the arrow 3 of FIG. 2.

The disc brake shown in FIGS. 1 to 4 comprises a movable caliper 10 mounted to slide on a fixed member or support 12. The caliper 10 is mounted to slide on the fixed support 12 by means of a pin 14 extending parallel to the axis of rotation of the rotating disc 16. In the embodiment illustrated, and as shown more particularly in FIG. 2, the axial pin 14 is fixed to the fixed support 12 by a threaded connection 18. The axial pin 14 is received so as to slide in a cylindrical bore 20 formed in one arm 22 of the caliper 10. Protective rubber bellows 24 and 26 are provided on either side of the arm 22 to protect the sliding surface formed by the outer surface of the axial pin 14. The fixed support 12 comprises two arms 28 and 30 which extend radially towards the periphery of the disc in a plane parallel to the faces of the rotating disc 16. When the rotating disc 16 rotates in the direction indicated in FIGS. 1 to 4 by the arrows AV, this being the forward direction of rotation of the disc corresponding to the forward movement of the vehicle (not shown) on which the brake is mounted, it defines the two arms of the fixed support 12 as being a front arm 28 and a rear arm 30. The disc brake also possesses a brake motor. In the embodiment illustrated, the brake motor 32 is a hydraulic brake motor comprising a cylindrical piston 34 mounted to slide in a cylindrical bore 36 machined in the sliding caliper 10. The axis XX common to the piston 34 and to the cylindrical bore 36 is parallel to the axis of rotation O of the disc. A recess 38 is formed in the piston 34 of the hydraulic brake motor 32. In the embodiment illustrated, the recess 38 formed in the piston consists of a bore coaxial to the axis XX of the piston 34.

The disc brake illustrated in the Figures possesses an inner friction element 40 capable of being stressed directly to engage frictionally with the inner face 15 of the rotating disc 16 when the hydraulic brake motor 32 is actuated, and an outer friction element 42 fixed to the end portion 11 of the caliper, commonly called the nose of the caliper. When the hydraulic brake motor 32 is actuated, the outer friction element 42 is stressed, as a result of raction via the sliding caliper 10, to engage frictionally with the outer face 17 of the rotating disc 16. The inner friction element 40 is received so as to be anchored and to slide in an aperture 44 of the fixed support 12. The aperture 44 is defined between the front and rear arms 28 and 30 of the fixed support and the upper edge 46 of the central portion 29 of the fixed support 12 connecting the arms 28 and 30. According to the invention, the threaded end 18 of the axial pin 14 is fixed to the peripheral end of the rear arm 30 of the fixed support 12. When the operator actuates the hydraulic brake motor 32 to slow down the rotating disc 16 when the latter rotates in the forward direction of rotation defined above, the inner frictional element 40 engages frictionally with the inner face 15 of the disc 16. This frictional engagement generates drag forces, of which the resultant applied to the friction element 40 stresses the latter in the direction indicated by the arrow A of FIG. 1 that is to say in a direction parallel to the tangent plane Pt and in the direction of the front arm 28 of the fixed support 12. The inner friction element 40 then bears on a bearing surface 48 formed on the front arm 28 of the fixed support 12. In the embodiment illustrated, the bearing surface 48 is a plane surface extending parallel to the radial plane Pr passing through the axis O of the disc 16 and through the axis XX of the bore 36 formed in the caliper 10. It will be understood that, in this way, since the effect of all the frictional forces generated by the frictional engagement of the inner friction element 40 with the inner face 15 of the disc is to slow down rotation in the forward direction of rotation of the disc, they are transmitted to the front arm 28 of the fixed support 12.

The outer friction element 42 is fixed to the nose 11 of the caliper 10 by fixing and positioning means which will be described in detail below. During the same actuation of the hydraulic brake motor 32, the friction element 42 is stressed to engage frictionally with the outer face 17 of the rotating disc 16, the frictional forces generated during this frictional engagement being transmitted initially to the nose 11 of the caliper and then, by means of the arch 9 of the caliper 10 extending beyond the periphery of the disc 16, to the arm 22 of the caliper 10. It will be understood that, in this way, the frictional forces generated by the frictional engagement of the element 42 with the disc 16 are transmitted to the axial pin 14 and therefore to the rear arm 30 of the fixed support 12.

Consequently, the frictional forces generated by the frictional engagement of the inner and outer friction elements during the slowing down of the disc rotating in the forward direction of rotation are distributed equally over the front and rear arms 28 and 30 of the fixed support. Such a distribution of the forces makes it possible for the arms 28 and 30 to have reasonable dimensions and thus to make savings in terms of material and therefore in terms of weight in the brake as a whole.

Figure 4:
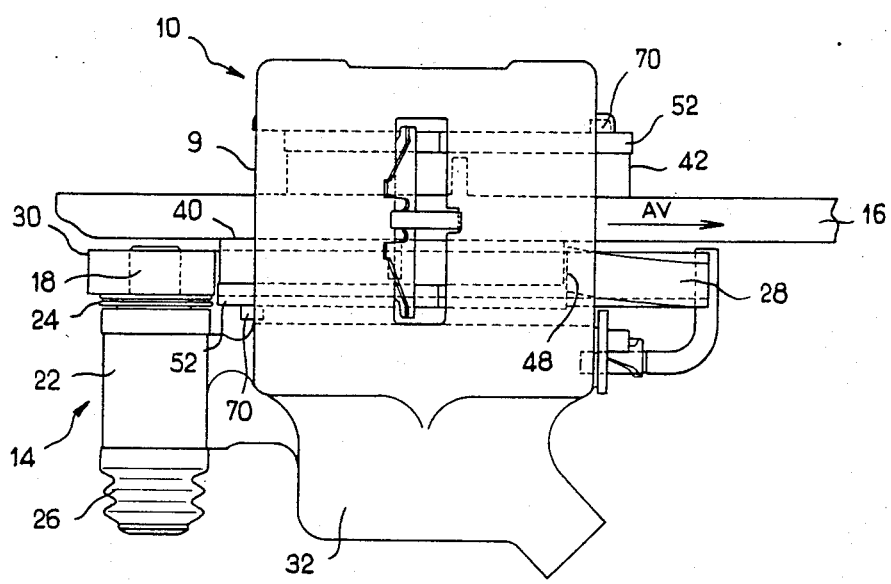
FIG. 4 is a top view of the disc brake shown in FIG. 3.

According to another characteristic of the invention, the bearing surface 48 of the inner friction element 40 is, as may be noted especially in FIG. 4, offset axially in the direction of the disc relative to the plane parallel to the faces of the disc, in which the front and rear arms of the fixed support extend. This axial offset makes it possible to ensure a correct support for the inner friction element 40 on the bearing surface 48 in proportion to the wear of the friction linings. When the hydraulic brake motor 32 is actuated so as to slow down rotation of the disc 16 when the latter rotates in the rearward direction of rotation, that is to say in the direction opposite that of forward rotation, the frictional forces generated by the engagement of the inner element 40 with the disc 16 are transmitted to the rear arm 30 of the fixed support 12, the inner element 40 then bearing on a bearing surface 50 formed on the rear arm 30. In this case, it will be understood that all of the frictional forces are transmitted to the rear arm 30 directly by the inner friction element 40 and, via the caliper 10 and the pin 14, by the outer friction element 42. Nevertheless, this grouping of the forces at the level of the rear arm 30 does not make it necessary for the latter arm to have large dimensions, since braking during reversing occurs only rarely, with braking torques often lower than during forward movement and for very short periods of time, the rear arm 30 thus not operating at the fatigue limit under this maximum load.

In the embodiment illustrated, the inner and outer friction elements 40 and 42 are identical. Each of the friction elements comprises a lining support plate 52 to which a friction lining 54 is fixed. In a brake with a sliding caliper of the type which is the subject of the present invention, the drag force T applied to the disc when the brake is actuated is transmitted to the rear arm 30 of the fixed support 12 via the sliding motion arising from the interaction between the axial pin 14 and the cylindrical bore 20 formed in the arm 22 of the caliper 10. The distance H separating the plane of the disc 16 to which the drag force is applied from the center point of the sliding of the axial pin 14 in the bore 20 gives rise to a torque tending to cause the caliper 10 to rotate in the tangent plane Pt in a clockwise direction, looking at FIG. 2. The consequence of this undesirable torque is generally to cause irregular wear of the friction linings, commonly called biased wear. To overcome this disadvantage, and according to a characteristic of the present invention, the center Ci of the friction lining 54 of the inner friction element 40 is offset tangentially in the direction of the rear arm 30 of the fixed support 12 relative to the radial plane Pr defined above. In the same way, the outer friction member 42 is fixed to the nose 11 of the caliper in such a way that the center Ce of the friction lining 54 of the outer friction element 42 is offset tangentially and in the direction of the front arm 28 of the fixed support 12 relative to the radial plane Pr. The offset Di of the center Ci of the friction lining of the inner friction element 40 and the offset of the center Ce of the friction lining of the outer element 42 have equal values on either side of the radial plane Pr, that is to say on either side of the axis XX common to the piston 34 and to the bore 36 of the hydraulic brake motor 32. In this way, it will be understood that the frictional engagement of the two friction elements with the rotating disc creates an opposing torque to the torque mentioned above and tends to balance the latter so as to prevent biased wear of the pads of the friction linings and so constituting differential wear correction means for each friction element.

As mentioned above and for obvious reasons of ease of manufacture and interchangeability of parts, the two inner and outer friction elements 40 and 42 are identical. It is therefore necessary to provide means for positioning the friction elements both in the fixed support and in the nose 11 of the caliper, making it possible to prevent any error in assembly of friction elements so as to ensure the desired offset of the friction linings. According to the invention, these positioning means consist, first of all, of a central portion 60 formed in the support plate 52 of each of the friction elements. In the embodiment illustrated, the central portion 60 is obtained by and consists of four cut-outs made in the lining support plate, which project from the plane of the latter in the opposite direction to the face provided with the friction lining 54. The four cut-outs 62 constituting the central portion 60 have an outer peripheral surface 64 of cylindrical shape. These cut-outs can be made in the support plate 52 by stamping the latter by means of a tool of corresponding shape. The central portion 60 formed in the support plate 52 of the outer friction element 42 is received in a bore of corresponding diameter 66 made in the nose 11 of the caliper. The bore 66 made in the nose 11 of the caliper is coaxial to the axis XX of the bore 36 in which is mounted the piston 34 of the hydraulic brake motor 32. It will be understood that the two bores 66 and 36 can be produced easily during a common operation for machining the caliper 10. In a symmetrical way, the central portion 60 of the support plate 52 of the inner friction element 40 is received in a recess 68 made in the piston 34 of the hydraulic brake motor 32. The recess 68 made in the piston 34 consists of a portion of greater diameter of the inner bore 38 of the piston 34. To ensure that none of the frictional forces generated during the frictional engagement of the inner friction element with the inner face 15 of the disc 16 is transmitted to the piston 34 of the brake motor and consequently to the caliper 10, the central portion 60 is received in the recess 68 with a radial play j.

To ensure the offset Di of the inner friction element and the offset De of the outer friction element, the geometrical center CeCi of the identical outer and inner friction elements 42 and 40 are each offset tangentially relative to the geometrical center P of the respective central portion 60 of the support plate 52. The geometrical centers P of the two central portions are, of course, located on the axis XX when the friction elements 40 and 42 occupy their normal operating positions.

It will be understood that it is also necessary to provide correcting means making it possible to ensure correct positioning of the friction elements in the brake. In fact, in the case of incorrect assembly particularly of the outer friction element 42, by pivoting the latter 180° about the axis XX relative to the position which it occupies in FIG. 1, or the assembly of one of the pads provided for the symmetrical brake, it is noted that the offset of the friction lining of the outer friction element would be located in the direction of the rear arm 30 of the fixed support 12, the two centers of the friction linings then coinciding with one another and the desired effect of an opposing torque consequently being nullified. In the embodiment illustrated and according to another characteristic of the invention, the correcting means consist of a cylindrical stud 70 screwed to the lining support plate 52 or obtained by a semi-cut-out from the support plate 52 and extending perpendicularly to the latter in the direction opposite the face provided with the friction lining 54. The correcting means also have a hole 72 made in the nose 11 of the caliper, in which the correcting stud 70 of the outer friction element 42 is capable of being received when the outer friction element occupies its correct assembly position. Opposite the hole 72 relative to the radial plane Pr there is a boss 74 of the nose 11 of the caliper 10, in which there is no hole 72; it will therefore be understood that it is impossible to carry out an incorrect assembly of the friction member, since the stud 70 then comes up against the boss 74 and the central portion 60 therefore cannot penetrate into the bore 66 made in the nose 11 of the caliper. In this way, the correcting stud 70 fixed to the lining support plate 52 of the inner friction element 40 is received in a clearance 76 made in the arm 22 of the caliper 10. Moreover, incorrect assembly of the inner friction element 40 is impossible because the central portion of the support plate 52 of the inner friction element could not penetrate into the recess 68 made in the piston 34. Furthermore, the stud 70 would come up against the side face 27 of the arm 28 of the fixed support 12.

The central portion 60 of the outer friction element 42 is fixed in the bore 66 made in the nose of the caliper 11 and the outer face of the lining support plate is kept in contact with the corresponding surface of the nose of the caliper by means of a spring blade 78 hooked on the four semi-circular cut-outs 62 forming the central portion 60 by small tongues 80 acting as buttresses on the corresponding surfaces of the four cut-outs 62.

According to another embodiment of the invention, the friction elements 40 and 42 are identical and do not show offset in tangential direction relative to the radial plane Pr passing through the axis XX of the piston 34. As previously explained, the distance H separating the plane of the disc 16 to which the drag force is applied from the center point of the sliding of the axial pin 14 in the bore 20 gives rise to a torque tending to cause the caliper 10 to rotate in the tangent plane Pt in a clockwise direction, looking at FIG. 2.

The center point of the sliding supports also the tangential force generated by the friction of the friction element 42. This force applied on pin 14 causes its deflection relative to the rear arm 30 to which the pin is fixed by the threaded connection 18. The free end of the pin 14 tends to deflect in the direction opposite to the clockwise direction, looking at FIG. 2, under the action of this tangential force. This deflection generates on the caliper 10 a torque of the same direction, i.e. in the direction opposite to the clockwise direction. It will be understood that the caliper being submitted to opposite torques, it is sufficient that these torques will be substantially identical to prevent differential wear on each friction element, i.e. that the friction lining 54 will be regularly worn in a parallel direction with the support plate 52. To have the opposite torques substantially identical and especially when the friction linings are nearly fully worn, the deflection of the pin 14 is controlled by a well advised choice of the pin diameter and the distances from the center point of the sliding to the disc plane on one side and on the other side to the fixing of the pin 14 on the rear arm 30. It is to be noticed that in this embodiment the avoiding of the differential wear takes place during forward direction, as described above, as well as during the rearward direction when the torques are inverted but stay opposite one relative to the other.

It will be clearly understood that in this embodiment the friction elements are identical and interchangeable without need of special positioning systems.

The disc brake illustrated in FIGS. 1 to 4 also has a friction element spring of the type described in U.S. patent application Ser. No. 345,175 filed Feb. 3, 1982, now U.S. Pat. No. 4,463,837, or any other type, which will not be described in any more detail here. The disc brake also has means for locking the caliper in position relative to the fixed support 12, consisting of a rod 82. The rod 82 will not be described in any more detail here, since this characteristic is the subject of a second patent application in the name of the Applicant, filed in France on the same day as the present application.

I claim:

1. A disc brake, comprising a caliper mounted to slide on a fixed support by means of a pin extending parallel to the axis of the disc, said fixed support comprising two arms extending radially toward the periphery of the disc, the two arms comprising a front arm and a rear arm in accordance with the forward direction of rotation of the disc relative to the fixed support, a brake motor including a piston mounted to slide in a bore of the caliper and acting directly on an inner friction element and, as a result of reaction via the caliper, on an outer friction element, the friction elements each including a support plate to which a friction lining is fixed, upon actuation of the brake motor said inner friction element bearing on a bearing surface formed on said front arm and thereby retarding rotation in the forward direction of rotation of the disc, said outer friction element fixed to the sliding caliper to which is transmitted friction forces generated when the outer friction element engages frictionally the rotating disc and the friction forces communicated to said pin and rear arm, the friction forces from the friction elements being distributed substantially equally to the front and rear arms of the fixed support, and differential wear correction means comprising the center of the friction lining of the inner friction element being offset tangentially in the direction of said rear arm relative to a radial plane passing through the axis of said piston, and the center of the friction lining of the outer friction element being offset tangentially in the direction of the front arm relative to said radial plane, the centers of the friction linings being offset equal distances from said radial plane in order to prevent differential wear of said linings, said inner friction element and outer friction element being identical and each support plate provided with positioning means interacting with corresponding means formed on the brake to assure correct positioning of said friction elements, the positioning means comprising a central portion of the respective support plate projecting from the plane of the plate, the central portion of the outer friction element being received in an aperture of corresponding shape disposed in the caliper and the central portion of the inner friction element being received in a recess in the piston of the brake motor, the positioning means further including correcting means comprising a cylindrical stud fixed to the support plate and extending perpendicularly to the plate, the stud of said outer friction element being received in a corresponding hole in the caliper, and the stud of said inner friction element being received in a clearance disposed in the caliper.

2. The disc brake according to claim 1, wherein each central portion has an outer peripheral surface of cylindrical shape, said aperture in the caliper consisting of a bore having a diameter corresponding to the cylindrical shape and coaxial with the bore of the caliper which receives the piston of the brake motor.

3. The disc brake according to claim 2, wherein said recess in the piston comprises a bore coaxial with the axis of said piston and slightly larger than said central portion of the support plate of the inner friction element which is received within the bore in the piston, so that when said inner friction element engages frictionally the disc none of the friction forces generated are transmitted to said piston of the brake motor.

4. The disc brake in accordance with claim 2, wherein the center of the friction lining is offset tangentially relative to the geometrical center of the central portion of the support plate.

5. The disc brake according to claim 1, wherein the hole in said caliper comprises an open-ended slot disposed in a circumferentially extending arm of said caliper.

* * * * *